Feb. 3, 1970   R. E. MONIGAL ET AL   3,493,816
RELAY CONTROL SYSTEM WITH DIFFERENTIAL ADJUSTMENT
Filed June 30, 1967
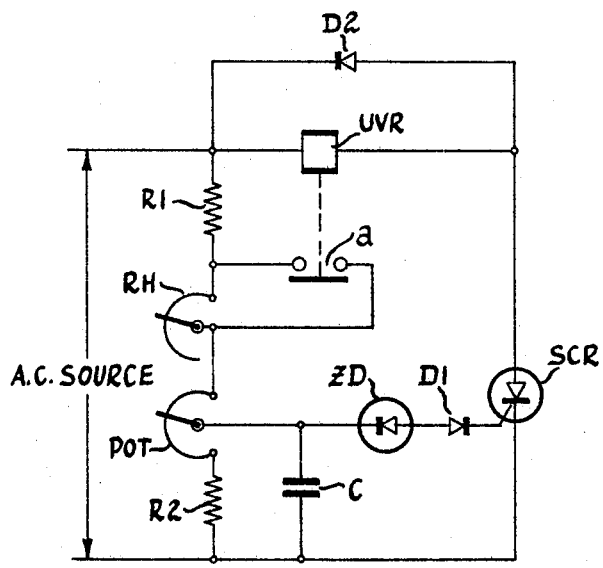
Inventors
Robert E. Monigal
Richard B. Ringle
William C. Swanson
By Wm. A. Autio
Attorney

United States Patent Office 3,493,816
Patented Feb. 3, 1970

---

3,493,816
RELAY CONTROL SYSTEM WITH DIFFERENTIAL ADJUSTMENT
Robert E. Monigal, Milwaukee, Richard B. Ringle, Shorewood, and William C. Swanson, Milwaukee, Wis., assignors to Cutler-Hammer, Inc., Milwaukee, Wis., a corporation of Delaware
Filed June 30, 1967, Ser. No. 650,302
Int. Cl. H02h 3/28; H01h 47/32
U.S. Cl. 317—31                     7 Claims

ABSTRACT OF THE DISCLOSURE

A semiconductor controlled recifier circuit supplied from an alternating current source for controlling a direct current undervoltage relay including a manually adjustable resistor and relay controlled contact in the gate circuit affording selection of the relay dropout voltage as a percentage such as 99 to 70 percent of the voltage at which the relay picks up.

Background of the invention

This invention relates to the field of electric circuits for relays and more particularly to the control of undervoltage relays and to adjustment of the differential between the pickup and dropout voltages thereof. In order to protect electrical systems from supply voltages that are too low for proper operation, undervoltage relays are used to maintain circuit closure as long as the supply voltage is high enough. If for any reason the supply voltage should decrease below a predetermined value, the undervoltage relay will reopen its contacts to disconnect power from the system.

In order to insure adequate power and to avoid frequent and unnecessary interruption of power from the system due to small and harmless variations in supply voltage magnitude, undervoltage relays have been provided with control circuits including potentiometers and the like for adjusting the system so that the supply voltage must exceed a predetermined value before the relay will operate. This relay will then maintain power on the system unless the supply voltage drops below a predetermined value whereupon the relay will disconnect power from the system. It will be apparent that the voltage at which the relay drops out may be less than the voltage at which the relay picks up. Since different systems have different allowable limits between pickup and dropout voltages of the undervoltage relay, these voltages are preferably adjustable. Although various means have been known for adjusting the pickup and/or dropout voltage values of a voltage sensing relay, these means have not been entirely satisfactory for one or more reasons such as cost, complexity, operating performance or the like.

Summary of the invention

Although semiconductor controlled rectifier circuits for controlling voltage sensing relays including the use of a potentiometer in the gate circuit for setting the pickup voltage of the relay have been known, such circuits have either relied on the "inherent" differential caused by the components in circuit or have not provided for any substantial or adjustable differential between the pickup and dropout voltages.

It has been discovered that in a semiconductor controlled rectifier circuit for controlling an undervoltage relay, along with use of a potentiometer for preselecting or adjusting the pickup value of voltage for the relay, preselection and adjustment of the dropout value of relay voltage can be provided simply and economically in the potentiometer circuit. To this end, there is provided in this potentiometer circuit an impedance means which bears a predetermined adjustable ratio relationship to the total impedance in the circuit. Since the control current must flow through this impedance means, if it is arranged to be shunted upon energization of the relay, the gate voltage will be shifted up thereby providing for a differential between the pickup and dropout voltages. The dropout voltage may be an adjustable percentage of the pickup voltage if these elements are connected in series. From this it will be apparent that the particular relationship between the pickup and dropout voltages will depend upon the manner in which these elements are connected in circuit.

An object of the invention is to provide an improved voltage sensing relay system.

A more specific object of the invention is to provide simple and economical means for adjusting the differential between the pickup and dropout voltages in a voltage sensitive relay circuit.

Another specific object of the invention is to provide improved means for adjusting the dropout voltage of an undervoltage relay relative to the pickup voltage thereof in a circuit employing a solid state switching element.

Other objects and advantages of the invention will hereinafter appear.

Brief description of the drawing

The above and other objects and advantages of the invention and the manner of obtaining them will best be understood by reference to the following description of a preferred embodiment of a relay control system with differential adjustment taken in conjunction with the accompanying drawing, wherein:

The figure is a schematic circuit diagram of a relay control system with operating differential adjustment constructed in accordance with the invention.

Description of the preferred embodiment

Referring to the figure, there is shown an undervoltage relay system with the invention incorporated therein. As shown therein, a voltage sensing or voltage responsive relay such as an undervoltage relay UVR has its operating coil connected in series with the anode and cathode of a semiconductor controlled rectifier SCR across an alternating current source, the relay coil being connected to the anode side.

The SCR is provided with a firing control circuit connected to its gate and being supplied from the A.C. source. This firing control circuit comprises a potentiometer POT whereby the voltage at which the relay picks up may be manually adjusted. This circuit also comprises a breakover device such as a Zener diode ZD connected in the gate circuit of the SCR to provide an avalanche of current for "firing" the SCR into conduction during periods of positive anode voltage thereon. A unidirectional conducting device such as a diode D1 is connected in the gate circuit of the SCR to block reverse current flow from the cathode to the gate and toward the potentiometer. The movable tap of the potentiometer is connected through the Zener diode and blocking diode to the gate of the SCR.

The resistor of the potentiometer is connected in a voltage divider circuit connected across the A.C. source for sensing the value of the supply voltage. This voltage divider circuit includes in series connection from the junction between one supply conductor and the coil of the relay a resistor R1, a rheostat or adjustable resistor RH, the resistor of the potentiometer and a resistor R2 to the junction between the other supply conductor and the cathode of the SCR. As will be apparent, this voltage divider circuit is connected directly across the A.C. source and in parallel with the relay coil and the SCR so that the voltage on this divider circuit will be proportional to the supply voltage which it is required to sense and will not be affected by the relay coil or the SCR.

The undervoltage relay is provided with a normally open contact $a$ in addition to the usual contacts (not shown) that a relay of this type has for closing supply circuits. This contact is connected across rheostat RH to effectively shunt this resistance out of circuit when the relay picks up. As will be apparent, rheostat RH and its shunting contact are placed in the opposite branch of the voltage divider circuit from the branch in which the breakover voltage for the Zener diode is developed. In this manner, the proper direction of voltage shift is obtained when the relay coil energizes to afford a differential between the pickup and dropout voltages of the relay.

A unidirectional diode D2 is connected across the coil of relay UVR and is poled to conduct current in the opposite direction relative to current flow in the SCR. This diode allows current flow in response to the induced voltage of the relay coil during the half-cycles of supply voltage when the SCR does not conduct thereby to maintain energization of the relay.

A capacitor C is connected across the lower branch of the voltage divider circuit, that is, across the movable tap and the lower portion of the potentiometer resistor and resistor R2. This capacitor will absorb transient line voltage peaks to prevent unwanted breakover of the Zener diode or firing of the SCR.

In operation, when alternating current is connected, current will flow through resistor R1, rheostat RH, the resistor of the potentiometer and resistor R2. Assuming that the voltage has its normal value, the tap of the potentiometer may be turned clockwise until the voltage across the lower portion of the potentiometer resistance and resistor R2 reaches breakover value. When this happens, an avalanche of current flows through the Zener diode and diode D1 into the gate to fire the SCR into conduction. As a result, current flows through the relay coil and the anode-cathode circuit of the SCR to energize the relay. This causes the relay to operate its working contacts hereinbefore mentioned and to close its contact $a$. As will be apparent, this contact shunts rheostat RH out of the circuit.

The closure of the relay contact affords a differential between the pickup and dropout voltages of the relay. To this end and considering only the positive half-cycles (upper supply conductor positive) of the supply voltage since the alternate negative half-cycles do not operate the SCR, removal of the rheostat from the circuit causes the voltage at the tap of the potentiometer to shift more positive. This means that breakover voltage will be applied to the Zener diode on each positive half-cycle even if the supply voltage amplitude decreases well below the voltage that was required for relay pickup. The relay will drop out if the supply voltage decreases low enough. The difference between the pickup and dropout voltages can be adjusted by adjusting rheostat RH. Turning the rheostat clockwise to reduce its resistance will reduce the differential. And turning the rheostat in the other direction will increase the differential. The amount by which the differential can be adjusted depends on the ratio of the rheostat resistance to the total resistance in the voltage divider circuit.

Resistors R1 and R2 provide limits to circuit adjustment and operation. Resistor R1 provides a limit to decrease in resistance in the upper branch of the voltage divider circuit and limits the current flow to the gate of the SCR in the event both the potentiometer and rheostat are turned all the way clockwise. Resistor R2 limits reduction of the resistance in the lower portion of the voltage divider. Use of such constant resistors R1 and R2 for those portions of the resistances that need not be adjusted also allows use of more limited range and thereby more economical potentiometer and rheostat to afford adjustment only within the range where needed.

A desirable characteristic of the invention is to provide improved means for adjusting the dropout voltage value of an undervoltage relay such that the pickup voltage value of the relay may thereafter be readjusted by using the potentioemter POT alone without significantly changing the percentage that the dropout voltage bears to the pickup voltage.

Typical values for the elements of the circuit may be as follows:

R1—1.8K 2 w.
R2—1.8K 2 w.
RH—10K 2 w.
POT—25K 2 w.
ZD—54 v. 2 w.
D1—1N2069
D2—GE A10E
C—0.1 microfarad 200 v.
SCR—RCA 40379
UVR—48VDC While the system hereinbefore described is effectively adapted to fulfill the objects stated, it is to be understood that we do not intend to confine our invention to the particular preferred embodiment of relay control system with differential adjustment disclosed, inasmuch as it is susceptible of various modifications without departing from the scope of the invention.

What is claimed is:

1. In a voltage sensing system having an electromagnetic relay supplied from an alternating current source, means for controlling energization of the relay comprising:
   a solid state gating type power control element connected in series with the relay coil across the source;
   and a voltage sensing circuit for controlling firing of said power control element comprising:
   voltage divider means connected to the source and having manually settable means for deriving an adjustable voltage proportional to the source voltage;
   means comprising a trigger element connecting said manually settable means to the gate of said power control element for firing said power control element into conduction when said adjustable voltage reaches the breakover value of said trigger element, the magnitude of source voltage at which said breakover value is reached being the pickup value of the relay;
   impedance means in said voltage divider means for determining the magnitude of source voltage at which the relay deenergizes or drops out;
   and means responsive to energization of the relay for switching said impedance means effectively out of the circuit thereby to establish a differential between the pickup and dropout values of source voltage.

2. The invention defined in claim 1, wherein said impedance means comprises:
   a resistor in series connection in said voltage divider means.

3. The invention defined in claim 2, wherein said resistor comprises:
   an adjustable resistor which may be varied to preselect the differential between the relay pickup and dropout values of source voltage.

4. The invention defined in claim 3, wherein said switching means comprises:
   a normally open contact on said relay for shunting said adjustable resistor.

5. The invention defined in claim 1, wherein said solid state gating type power control element comprises:
   an anode connected through the relay coil to one side of the source;
   and a cathode connected to the other side of the source;
   and said impedance means is connected in the portion of said voltage sensing circuit between said manually settable means and said one side of said source.

6. In an undervoltage relay system having the relay coil connected in series with a semiconductor controlled rectifier across an alternating current supply and a voltage sensitive control circuit for the controlled rectifier including voltage divider means comprising a potentiometer connected across the supply and firing control current pulse forming means connected between the tap of the potentiometer and the gate of the controlled rectifier, the potentiometer being adjustable to select the value of supply voltage at which the relay picks up, the improvement comprising:

a resistor connected in series with the potentiometer; and a contact on the relay for shunting said resistor when the relay picks up, said resistor being connected on the proper side of the potentiometer to cause an increase in the voltage at the tap thereof when said resistor is shunted thereby to establish a differential between the relay pickup and dropout voltage values effective to delay dropout of the relay until the supply voltage decreases to a predetermined percentage of said pickup value of the supply voltage.

7. The invention defined in claim 6, wherein said resistor is manually adjustable to afford preselection of the differential between said pickup and dropout values of supply voltage.

References Cited

UNITED STATES PATENTS

| | | | |
|---|---|---|---|
| 3,296,498 | 1/1967 | Chassanoff | 317—23 |
| 3,329,869 | 7/1967 | Obenhaus | 317—23 |

LEE T. HIX, Primary Examiner

A. D. PELLINEN, Assistant Examiner

U.S. Cl. X.R.

317—148.5